United States Patent
Sasahara et al.

(10) Patent No.: US 8,155,464 B2
(45) Date of Patent: Apr. 10, 2012

(54) IMAGE COMPRESSION UNIT, IMAGE DECOMPRESSION UNIT, AND ULTRASONIC DIAGNOSTIC DEVICE

(75) Inventors: Toshiyuki Sasahara, Miyagi (JP); Kazuhiko Kikuchi, Miyagi (JP); Kazuhiro Sunagawa, Miyagi (JP); Yoshinobu Watanabe, Kanagawa (JP)

(73) Assignee: Panasonic Corporation, Osaka (JP)

( * ) Notice: Subject to any disclaimer, the term of this patent is extended or adjusted under 35 U.S.C. 154(b) by 967 days.

(21) Appl. No.: 12/097,854

(22) PCT Filed: Dec. 21, 2006

(86) PCT No.: PCT/JP2006/325506
§ 371 (c)(1),
(2), (4) Date: Jun. 17, 2008

(87) PCT Pub. No.: WO2007/072913
PCT Pub. Date: Jun. 28, 2007

(65) Prior Publication Data
US 2009/0281425 A1    Nov. 12, 2009

(30) Foreign Application Priority Data

Dec. 21, 2005  (JP) .................................. 2005-368378

(51) Int. Cl.
*G06K 9/36* (2006.01)

(52) U.S. Cl. ........................ 382/250; 382/246; 382/232

(58) Field of Classification Search .................. 382/250, 382/246, 248, 232
See application file for complete search history.

(56) References Cited

U.S. PATENT DOCUMENTS

| 5,416,604 | A  | * | 5/1995  | Park ............................... 382/232 |
| 5,799,111 | A  |   | 8/1998  | Guissin |
| 6,052,814 | A  | * | 4/2000  | Karasawa ..................... 714/755 |
| 6,571,014 | B1 | * | 5/2003  | Larkin ........................... 382/232 |
| 6,577,681 | B1 |   | 6/2003  | Kimura |
| 7,627,180 | B2 | * | 12/2009 | Tabuchi et al. ................. 382/232 |
| 7,903,732 | B2 | * | 3/2011  | Shindo ..................... 375/240.03 |
| 2005/0135693 | A1 |   | 6/2005  | Ahmed et al. |

FOREIGN PATENT DOCUMENTS

| DE | 69220541 T2 | 1/1998 |
| EP | 0513520 B1  | 6/1997 |
| JP | 5-145764    | 6/1993 |
| JP | 9-75340     | 3/1997 |
| JP | 9-98418     | 4/1997 |
| JP | 2000-92330  | 3/2000 |
| JP | 2003-18559  | 1/2003 |
| KR | 2001-24871  | 3/2001 |
| WO | WO 00/30540 A1 | 6/2000 |

* cited by examiner

*Primary Examiner* — Louis Arana
(74) *Attorney, Agent, or Firm* — Hamre, Schumann, Mueller & Larson, P.C.

(57) ABSTRACT

An image compression unit includes a block divider that divides image data into a plurality of blocks, a DCT portion that subjects the image data of each block to DCT, a quantization factor output portion that outputs a quantization factor as a numerical value indicative of fineness of quantization, a correction value computation portion that computes a correction value that is determined uniquely according to a position of a block of image data, a quantizer that quantizes the data having been subjected to DCT, based on a value obtained by multiplying the correction value by the quantization factor, and an encoder that encodes the quantized data and outputs compressed data. This configuration makes it possible to provide an image compression/decompression unit that is capable of varying a compression ratio in a frame, without encoding compression parameters of each block.

13 Claims, 13 Drawing Sheets

| Block position | Correction value α |
|---|---|
| 0 | 0.2 |
| 1 | 0.3 |
| ... | ... |
| 15 | 1.8 |

Smaller depth ⎯⎯⎯⎯⎯→ Greater depth

IMAGE COMPRESSION UNIT, IMAGE DECOMPRESSION UNIT, AND ULTRASONIC DIAGNOSTIC DEVICE

TECHNICAL FIELD

The present invention relates to an image compression unit and an image decompression unit that are used when image data are compressed and encoded, and then recorded or transmitted, and relates to an ultrasonic diagnostic device in which these units are used.

BACKGROUND ART

Recently, regarding an ultrasonic diagnostic device that performs image diagnosis with respect to an object by using ultrasonic waves, studies have been made about a configuration for compressing, and recording or transmitting data of reflected wave signals obtained from a probe. For example, reflected wave signal data obtained from a probe are compressed and thereafter transmitted to a device main body through a cable, while in the device main body, and conversely, the compressed data are decompressed so that the original reflected wave signal data are reproduced, whereby a predetermined image display is performed. By so doing, the reduction of transmitted data amount and the high-speed transmission of data are enabled.

There are ultrasonic-diagnosis-use probes of various shapes and various types, among which a convex-type probe having a sectoral range of ultrasonic scanning as shown in FIG. 17 is used widely. In FIG. 17, the range of scanning with use of ultrasonic waves emitted from a probe 101 toward the inside of a measurement object 102 has a sectoral shape that is widened as the depth increases. In the ultrasonic scanning range, straight lines of ultrasonic waves are emitted from the probe 101 toward the inside of the measurement object 102 with the angle of emission being varied gradually as shown in FIG. 17, and these lines are called acoustic lines. There are n acoustic lines 103 (103-1 to 103-$n$), from the left end to the right end of the sectoral scanning range.

FIG. 18 schematically illustrates the structure of reflected wave signal data of one frame. As shown in FIG. 18, acoustic line data 104-1 to 104-$n$ corresponding to the number n of acoustic lines 103 are stored in a vertical direction in sequence. In each frame (acoustic line data group) 104, a datum closer to the right end is a datum at a greater depth.

FIG. 19 schematically illustrates an ultrasonic image displayed according to a sectoral scanning range. When the intensity of a reflected wave signal obtained from a probe is displayed on a screen 105, an ultrasonic image obtained by modulating an intensity of a reflected signal is displayed in a sectoral area 106 corresponding to a scanning range, as shown in FIG. 19. This display mode is called "B-mode". This display mode allows intuitive diagnosis since an ultrasonic image in a sectoral range identical to a scanning range is displayed on a screen.

For such an ultrasonic image display, the display is performed after modifying image data of one frame as shown in FIG. 18 into a sectoral display range as shown in FIG. 19. Here, since the density of pixels on the screen is uniform, the acoustic line density in the displayed screen varies with the depth, as is understandable from FIG. 19. The acoustic line density is indicative of a value obtained by dividing the total number of acoustic lines by the number of display pixels. For example, assuming that the number of display pixels along an arc corresponding to a part of the smallest depth (the part closest to the center of the sector) is m1 and the acoustic line density of the foregoing part is A, A=n/m1 is yielded. Assuming that the number of display pixels along an arc corresponding to a part of the greatest depth (the part farthest to the center of the sector) is m2 and the acoustic line density of the foregoing part is B, B=n/m2 is yielded. m1<m2, and hence A>B. Thus, as the depth increases (the proximity to the center of the sector decreases), the acoustic line density decreases.

Further, as a method for compressing and encoding static image data, the JPEG method has been predominant conventionally, and it is possible to apply the JPEG method to the data compression of reflected wave signal in an ultrasonic diagnostic device.

FIG. 20 is a block diagram illustrating a schematic configuration of a conventional static image compression unit typically using the JPEG method. In FIG. 20, 11 denotes a block divider, 12 denotes a DCT (discrete cosine transformation) portion, 13 denotes a quantizer, 14 denotes an encoder, and 15 denotes a quantization factor output portion. Further, FIG. 21 is a block diagram illustrating the internal configuration of the quantization factor output portion 15 in the image compression unit shown in FIG. 20. In FIG. 21, 18 denotes a basic quantization table in which values that the quantization factors (values indicative of the fineness of quantization) are based on are shown in accordance with the sizes of blocks, and 19 denotes a multiplier that outputs a quantization factor derived by multiplication of a value obtained from the basic quantization table 18 by a preset scale factor (parameter for adjusting a compression ratio).

As shown in FIGS. 20 and 21, first, image data inputted are divided into 8×8-pixel blocks by the block divider 11. Each block is subjected to DCT by the DCT portion 12. The DCT coefficient outputted as a result of the DCT is quantized by the quantizer 13 according to the quantization factor given by the quantization factor output portion 15, and is converted into a Huffman code by the encoder 14, whereby compressed data are obtained.

FIG. 22 is a schematic block diagram showing a conventional static image decompression unit typically using the JPEG method. In FIG. 22, 31 denotes a decoder for decoding Huffman codes, 32 denotes an inverse quantizer for performing inverse quantization, 33 denotes an inverse DCT portion for applying inverse DCT, and 34 denotes an inverse quantization factor output portion.

As shown in FIG. 22, the compressed data inputted are decoded by the decoder 31, while being fed to the inverse quantization factor output portion 34, so that an inverse quantization factor to be used in the inverse quantization is extracted. The decoded data outputted from the decoder 31 are fed to the inverse quantizer 32, and the inverse quantizer 32 inversely quantizes the decoded data by using the inverse quantization factor fed from the inverse quantization factor output portion 34. The output from the inverse quantizer 32 is fed to the inverse DCT portion 33, and is subjected to inverse DCT by the inverse DCT portion 33, thereby becoming image data.

In the case where the above-described static image compression processing and the decompression processing as described above are performed, the compression ratio can be set frame by frame. However, in the case where the compression is performed with a certain region in the frame being focused, if the compression ratio is set relatively lower in accordance with the focused region, the image quality of the non-focused regions improves more than necessary. To the contrary, in the case where the overall compression ratio is set relatively higher, a sufficient image quality cannot be obtained with respect to the focused region.

Likewise, if the above-described method is applied without modification to the compression and decompression of image data in an ultrasonic diagnostic device using a convex-type probe, the inconvenience owing to the variation of the acoustic line density as described above occurs. For example, in the case where the compression and encoding of image data using a quantization table commonly is applicable to one entire frame, if the compression ratio is adjusted so as to be suitable for a region with a higher acoustic line density, the image quality of regions with lower acoustic line densities is impaired. To the contrary, if the compression ratio is adjusted so as to be suitable for a region with a lower acoustic line density, codes in an amount more than necessary are used in regions with higher acoustic densities.

As a method to cope with these problems, a method as follows is available: a compression ratio commonly applicable to an entire frame is not used, but one frame is divided into blocks and the compression ratio is switched block by block. This method is included in the JPEG extended standard. More specifically, the quantization table to be used is designated for each block, and selection information of the quantization table is encoded, so that the compression ratio is adjusted for each block.

Further, as shown in FIG. 21, a value obtained by multiplying a value obtained from a quantization table by a scale factor is fed as a quantization factor to the quantizer so that the step width in the quantization is adjusted. It is possible to vary this scale factor block by block and encode the value of the scale factor, so as to adjust the compression ratio for each block.

However, these methods require the encoding of compression parameters such as selection information of a quantization table or a scale factor, and hence the amount of codes may increase for the same, whereby the data amount as a whole also may increase.

Then, another method has been proposed, in which using the high correlation between the scale factor or the selection information of the quantization table for each block and a DC differential that is a differential between DC coefficients of blocks after DCT, the DC differential information and the scale factor information are combined and encoded, whereby necessary compression parameters are encoded efficiently (see e.g. JP 2000-92330 A).

FIG. 23 is a block diagram illustrating a configuration of an image data compression unit utilizing the foregoing method. In this method, as shown in FIG. 23, image data are processed by the block divider 11, the DCT portion 12, and the quantizer 13. The quantization step width is determined by multiplying the matrix of the basic quantization table 18 by a scale factor computed by a scale factor computation circuit 81. A quantified AC component is encoded by an AC component encoding circuit 83. A quantified DC component is converted into a DC differential by a DC differential computation circuit 84, and further, converted into a group number and an additional bit by a grouping circuit 85. The scale factor also is converted into a scale factor differential by a scale factor differential computation circuit 82, and further, converted into a group number and an additional bit by a grouping circuit 86. The group numbers of the DC component and the scale factor are encoded by a two-dimensional Huffman encoding circuit 87, and are outputted after each code element thereof is multiplexed by a multiplexing circuit 88.

Patent Document 1: JP 2000-92330 A

DISCLOSURE OF INVENTION

Problem to be Solved by the Invention

However, even in the case where the aforementioned method described in the Patent Document 1 is used, if the encoding involves the encoding with respect to compression parameters of each block, this also results in an increase in the amount of codes f the compression parameters. Therefore, in the case where the compression ratio is varied block by block with regard to a focused portion in a frame, the amount of data increases according to the amount of codes of the compression parameters.

Besides, ultrasonic image data obtained by an ultrasonic diagnostic device using a probe having a sectoral scanning range have an acoustic line density that varies with the depth, and hence, the compression ratio has to be varied block by block so as to adjust the compression ratio in accordance with the varied acoustic line density. As a result, the amount of codes of compression parameters increases, which causes the compression ratio to decrease.

The present invention has been made to solve the conventional problems as described above, and is intended to provide an image compression/decompression unit that is capable of varying the compression ratio in one frame without encoding compression parameters of each block, in the case where the image quality (resolution) of an original image varies in the frame regularly by a certain rule.

Means for Solving Problem

An image compression unit of the present invention includes: a block divider that divides inputted image data into a plurality of blocks; a DCT portion that subjects the image data of each block to DCT; a quantization factor output portion that outputs a quantization factor as a numerical value indicative of fineness of quantization; a correction value computation portion that computes a correction value that is determined uniquely according to a position of a block of image data; a quantizer that quantizes the data having been subjected to DCT, based on a value obtained by multiplying the correction value outputted by the correction value computation portion by the quantization factor outputted by the quantization factor output portion; and an encoder that encodes the quantized data and outputs compressed data.

An image decompression unit of the present invention includes: a decoder that decodes encoded compressed data; an inverse quantization factor output portion that derives an inverse quantization factor from the compressed data and outputs the inverse quantization factor; a correction value computation portion that computes a correction value that is determined uniquely according to a position of a block of image data; an inverse quantizer that, as to each block, inversely quantizes the output data of the decoder corresponding to the block, based on a value obtained by multiplying the correction value outputted by the correction value computation portion by the quantization factor outputted by the inverse quantization factor output portion; and an inverse DCT portion that subjects the inversely quantized data to inverse DCT and outputs image data restored into a non-compressed state.

Further, an ultrasonic diagnostic device of the present invention includes: an ultrasonic probe that transmits ultrasonic waves to a measurement object, receives reflected waves from the measurement object, and convert the reflected waves into electric signals; an image compression unit that compresses ultrasonic image data obtained by processing the electric signal of the reflected waves obtained from the ultrasonic probe; and an image decompression unit that decompresses compressed ultrasonic image data so as to obtain ultrasonic image data restored into a non-compressed state. In the foregoing ultrasonic diagnostic device, the image compression unit includes: a block divider that divides inputted image data into a plurality of blocks; a DCT portion that subjects the image data of each block to DCT; a quantization factor output portion that outputs a quantization factor as a numerical value indicative of fineness of quantization; a first correction value computation portion that computes a correction value that is determined uniquely according to a position of a block of image data; a quantizer that quantizes the data having been subjected to DCT, based on a value obtained by multiplying the correction value outputted by the first correction value computation portion by the quantization factor outputted by the quantization factor output portion; and an encoder that encodes the quantized data and outputs compressed data. Also in the foregoing ultrasonic diagnostic device, the image decompression unit includes: a decoder that decodes encoded compressed data; an inverse quantization factor output portion that derives an inverse quantization factor from the compressed data and outputs the inverse quantization factor; a second correction value computation portion that computes a correction value that is determined uniquely according to a position of a block of image data; an inverse quantizer that, as to each block, inversely quantizes the output data of the decoder corresponding to the block, based on a value obtained by multiplying the correction value outputted by the second correction value computation portion by the quantization factor outputted by the inverse quantization factor output portion; and an inverse DCT portion that subjects the inversely quantized data to inverse DCT and outputs image data restored into a non-compressed state.

Effects of the Invention

With the image compression unit, the image decompression unit, and the ultrasonic diagnostic device of the present invention, the value of the quantization factor can be varied according to the block position of the image data. Therefore, this makes it easier to vary the compression ratio according to the block position, thereby making it easier to perform compression/decompression suitable for image quality characteristic of image data. Besides, since it is unnecessary to encode compression parameters of each block, the increase of the amount of codes (the decrease of the compression ratio) can be avoided.

Figures 1, 2:
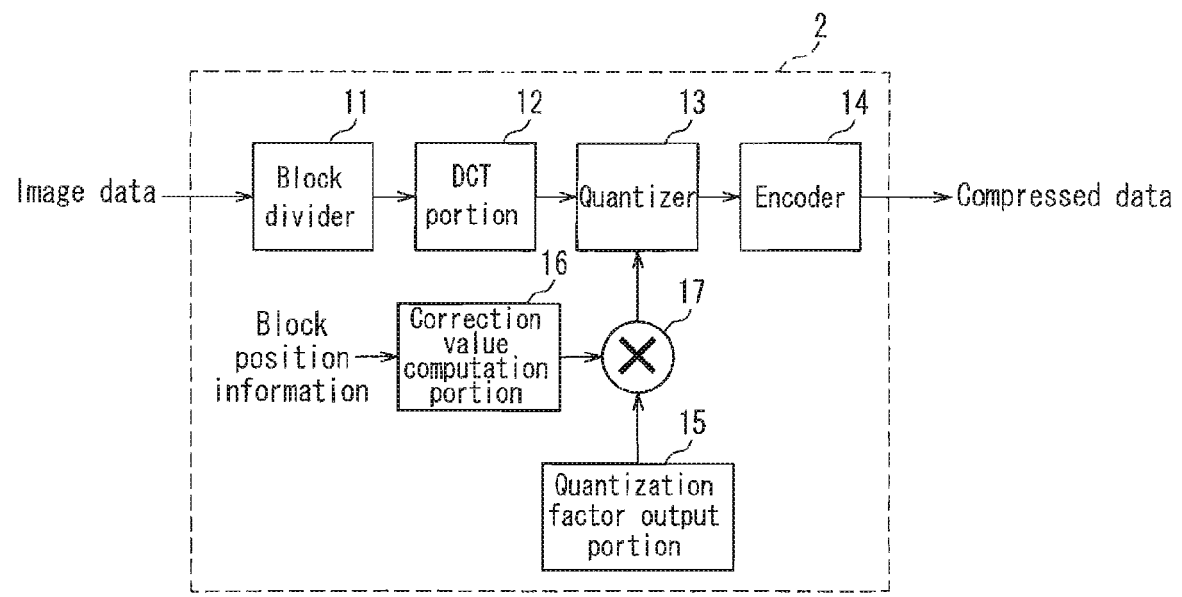
FIG. 1 is a block diagram illustrating a schematic configuration of an image compression unit according to Embodiment 1 of the present invention.
FIG. 2 shows exemplary block positions in a frame, regarding the operation by the correction value computation portion in FIG. 1.

BRIEF DESCRIPTION OF REFERENCE NUMERALS 1 ultrasonic diagnostic device
2 image compression unit
3 image decompression unit
11 block divider
12 DCT portion
13 quantizer
14 encoder
15 quantization factor output portion
16 correction value computation portion
17 multiplier
18 basic quantization table
19 multiplier
20 frame
21 block
22 next block
23 acoustic line data
24 pixel
31 decoder
32 inverse quantizer
33 inverse DCT portion
34 inverse quantization factor output portion 35 multiplier
41 ultrasonic probe
42 first additional information separator
43 first additional information combiner
44 selector
45 second additional information separator
46 second additional information combiner
47 image display portion
48 first probe information acquisition portion
49 second probe information acquisition portion
50 reversible compressor
51 reversible decompressor

DESCRIPTION OF THE INVENTION

In a preferred embodiment of the ultrasonic diagnostic device of the present invention, each of the first correction value computation portion and the second correction value computation portion presents the positions of the blocks with two-dimensional numerical values, and computes the correction value based on the two-dimensional numerical values. With this configuration, for example, it is made easier to vary the correction value (compression ratio) only in the depth direction of the measurement object. As a result, it is made possible to vary the correction value (compression ratio) more suitably according to the image quality characteristic of the image data.

In another preferred embodiment of the ultrasonic diagnostic device of the present invention, each of the first correction value computation portion and the second correction value computation portion computes, as the correction value, a value commonly applicable to a region that groups a plurality of the blocks. For example, four blocks are grouped into one region, and different correction values are computed for such regions, respectively, while each correction value is common to an entirety of the region concerned. With this configuration, it is made possible to vary the correction value (compression ratio) appropriately according to the image quality characteristic of image data, while reducing the load of the processing operation.

In still another preferred embodiment of the ultrasonic diagnostic device of the present invention, each of the first correction value computation portion and the second correction value computation portion computes the correction value according to the position of the block in a depth direction in the measurement object in the ultrasonic image data. In a more specific configuration, each of the first correction value computation portion and the second correction value computation portion computes the correction value so that as the depth in the measurement object in the ultrasonic image data increases, a compression ratio for an involved block decreases. With this configuration, it is possible to perform image compression and decompression according to image quality characteristic of image data in a display mode in which ultrasonic image data are displayed in a sectoral region in accordance with an ultrasonic scanning range.

In still another preferred embodiment of the ultrasonic diagnostic device of the present invention, each of the first correction value computation portion and the second correction value computation portion computes the correction value according to the position of the block, by referring to a preliminarily stored table that shows the relationship between the block positions and the correction values. With this configuration, a correction value can be computed (derived) faster as compared with the case where a correction value is computed by an arithmetic operation, whereby the load of the processing operation is reduced.

The ultrasonic diagnostic device of the present invention may be configured further to include: a first additional information separator that separates the ultrasonic image data obtained from the ultrasonic probe into image data and additional information; a first probe information acquisition portion that acquires probe information from the additional information outputted by the first additional information separator; a first additional information combiner that combines the additional information with image data compressed by the image compression unit; a second additional information separator that separates the ultrasonic compressed data combined by the first additional information combiner into image data and additional information; a second probe information acquisition portion that acquires probe information from the additional information outputted by the second additional information separator; and a second additional information combiner that combines the additional information with image data decompressed by the image decompression unit, wherein the first correction value computation portion computes a correction value that is determined uniquely according to the probe information as well as information of a block position of the image data, and the second correction value computation portion computes a value that is identical to the value computed by the first correction value computation portion.

The ultrasonic diagnostic device of the present invention may be configured further to include: a first additional information separator that separates the ultrasonic image data obtained from the ultrasonic probe into image data and additional information; a reversible compressor that reversibly compresses the additional information separated by the first additional information separator; a first additional information combiner that combines the reversibly compressed additional information with the image data compressed by the image compression unit; a second additional information separator that separates the compressed data combined by the first additional information combiner into image data and additional information; a reversible decompressor that reversibly decompresses the additional information separated by the second additional information separator; and a second additional information combiner that combines the reversibly decompressed additional information with image data decompressed by the image decompression unit.

The ultrasonic diagnostic device of the present invention may be configured further to include: a first additional information separator that separates the ultrasonic image data obtained from the ultrasonic probe into image data and additional information; a first probe information acquisition portion that acquires probe information from the additional information outputted by the first additional information separator; a first correction value computation portion that computes a correction value that is determined uniquely according to the probe information and information of the block position upon image compression; a reversible compressor that reversibly compresses the additional information; a first additional information combiner that combines the reversibly compressed additional information with the image data compressed by the image compression unit; a second additional information separator that separates the ultrasonic compressed data combined by the first additional information combiner into image data and additional information; a reversible decompressor that reversibly decompresses the additional information separated by the second additional information separator; a second probe information acquisition portion that acquires probe information from the additional information outputted by the reversible decompressor; a second correction value computation portion that computes a correction value based on the probe information and the block position information, the correction value being identical to the correction value upon image compression; a second additional information combiner that combines the additional information with image data decompressed by the image decompression unit, wherein the first additional value computation portion computes a correction value that is determined uniquely according to the probe information as well as information of a block position of the image data, and the second correction value computation portion computes a value that is identical to the value computed by the first correction value computation portion.

The following describes embodiments of the present invention while referring to the drawings.

Embodiment 1

FIG. 1 is a block diagram illustrating a schematic configuration of an image compression unit according to Embodiment 1 of the present invention. In FIG. 1, the image compression unit 2 includes a block divider 11, a DCT portion 12, a quantizer 13, an encoder 14, a quantization factor output portion 15, a correction value computation portion (first correction value computation portion) 16, and a multiplier 17. The block divider 11 divides image data into a plurality of blocks. The DCT portion 12 subjects the data fed from the block divider 11 to DCT (discrete cosine transformation). The quantizer 13 divides a DCT coefficient fed from the DCT portion 12 by an output of the multiplier 17, and rounds the result to an integer. The encoder 14 encodes data fed from the quantizer 13, and outputs compressed data. The quantization factor output portion 15 outputs a quantization factor that is to be used for quantization. The correction value computation portion 16 computes a correction value a for correcting the quantization factor according to block position information. The multiplier 17 multiplies the quantization factor fed from the quantization factor output portion 15 by the correction value a fed from the correction value computation portion 16, and the result is fed to the quantizer 13.

Figure 21:
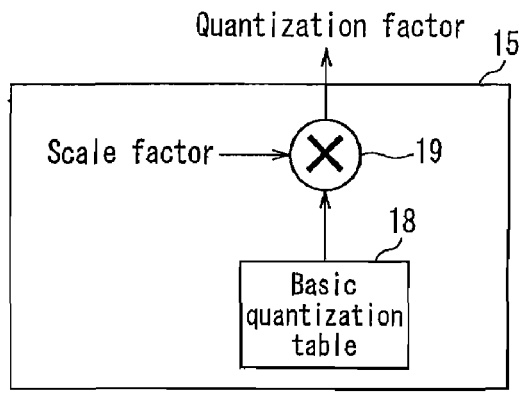
FIG. 21 is a block diagram illustrating an internal configuration of the quantization factor output portion in the image compression unit shown in FIG. 20.
Figure 22:
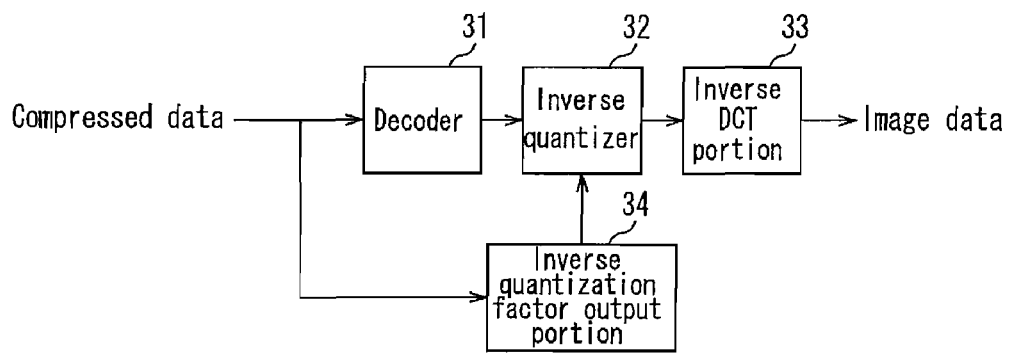
FIG. 22 is a block diagram showing a configuration of a conventional image decompression unit.
Figure 23:
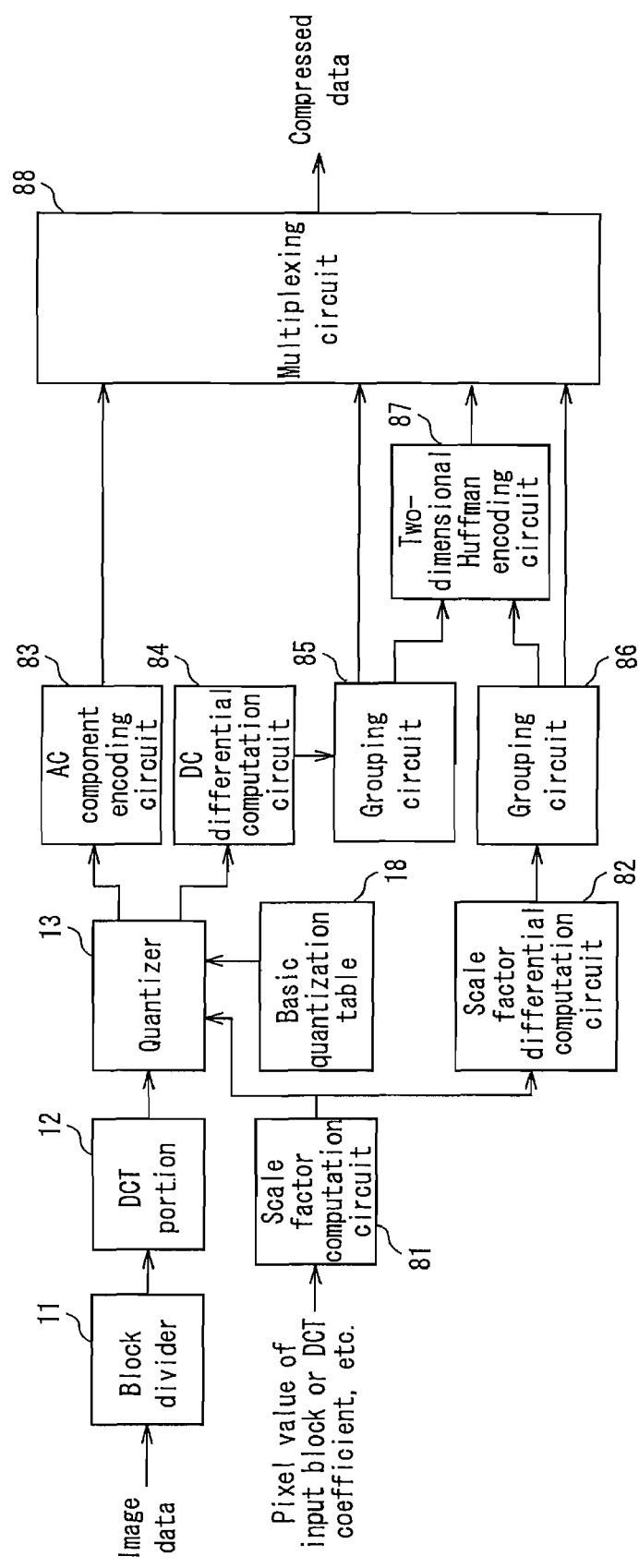
FIG. 23 is a block diagram showing an exemplary configuration of an image compression unit of the Patent Document 1.

An internal configuration of the quantization factor output portion 15 is as described in the "Background Art" section with reference to FIG. 21. In other words, the quantization factor output portion 15 includes a basic quantization table 18 in which values that the quantization factors are based on are shown in accordance with the sizes of blocks, and a multiplier 19 that multiplies a value obtained from the basic quantization table 18 by a preset scale factor. The output from the multiplier 19 is a quantization factor as an output of the quantization factor output portion 15.

The image data inputted to the image compression unit 2 are divided into a plurality of blocks by the block divider 11, and for each block as a unit, the following processing operations are performed. Image data of one block as a unit, outputted by the block divider 11, are subjected to DCT by the DCT portion 12, whereby a DCT coefficient is outputted. The DCT coefficient fed from the DCT portion 12 is quantized by the quantizer 13. Here, the quantizer 13 performs quantization according to an output of the multiplier 17, which is a product of the quantization factor fed from the quantization factor output portion 15 and the correction value α computed by the correction value computation portion 16 based on the block position information. The quantization factor is a product obtained by multiplication of the value obtained from the basic quantization table 18 by the scale factor, which is performed by the multiplier 19, as described above (see FIG. 21). The output data of the quantizer 13 are fed to the encoder 14, and are encoded with variable length codes such as Huffman codes. The encoded data are outputted as compressed data by the image compression unit 2.

Figure 3:
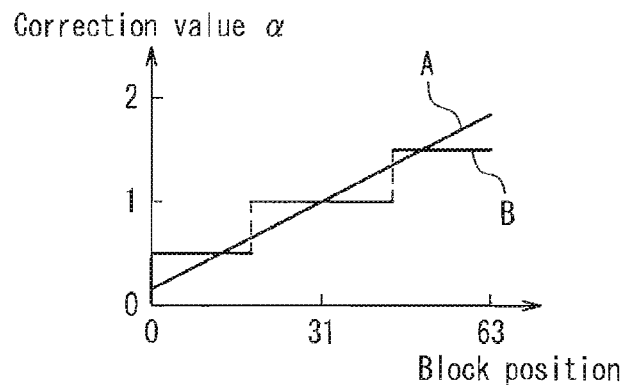
FIG. 3 is a graph showing the relationship between the block positions and the correction value a shown in FIG. 2.

The correction value α computed by the correction value computation portion 16 may be any value that is determined uniquely according to the block position in one-to-one correspondence. FIG. 2 shows exemplary block positions in a frame, regarding the operation by the correction value computation portion 16 in FIG. 1. In the example shown in FIG. 2, a frame 20 is divided into blocks 21 that are 4 rows×16 columns=64 in number, and each block is composed of pixels that are 8×8=64 in number. The number attached to each block is indicative of the block position. FIG. 3 is a graph showing the relationship between the block positions (numbers) and the correction value α shown in FIG. 2. In FIG. 3, the straight line A shows an example in the case where the value of the correction value α varies continuously according to the block position (linear variation). The step-like graph B shows an example in the case where the correction value α varies stepwise according to the block position (nonlinear variation).

Thus, the correction value α is determined uniquely according to the block position. Therefore, even if a compression parameter of each block such as the correction value α or the quantization factor after the multiplication by the correction value α is not added to the compressed data, the compression ratio can be varied block by block.

Incidentally, FIG. 3 shows an exemplary relationship such that the value of the correction value α corresponding to the block position equivalent to the vicinity of the center of the frame 20 is assumed to be 1 and the correction value α increases as the number indicative of the block position increases. However, the relationship between the block position and the correction value α is not limited to this example, and the relationship may be any one as long as the correction value α can be determined uniquely according to the block position.

Further, the multiplier 17 is not necessarily disposed after the quantization factor output portion 15, and it may be disposed between the basic quantization table 18 and the multiplier 19 in the quantization factor output portion 15. In other words, the configuration may be such that the value obtained from the basic quantization table 18 is multiplied by the correction value α before being multiplied by the scale factor.

Embodiment 2

Figure 4:
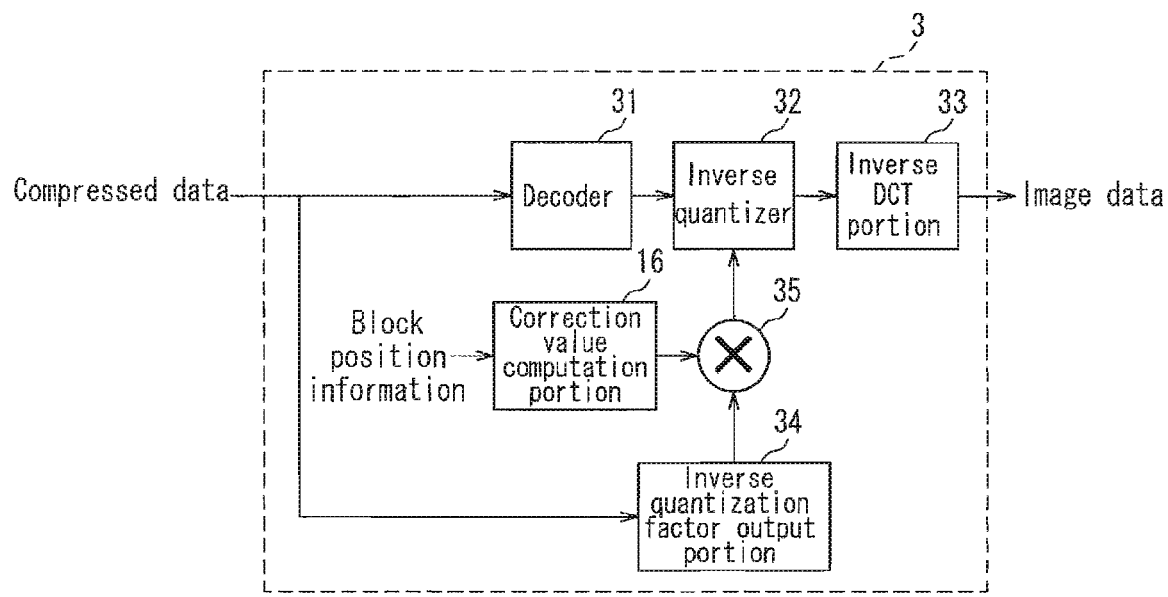
FIG. 4 is a block diagram illustrating a schematic configuration of an image decompression unit according to Embodiment 2 of the present invention.

FIG. 4 is a block diagram illustrating a schematic configuration of an image decompression unit according to Embodiment 2 of the present invention. In FIG. 4, an image decompression unit 3 includes a decoder 31, an inverse quantizer 32, an inverse DCT portion 33, an inverse quantization factor output portion 34, a multiplier 35, and a correction value computation portion (second correction value computation portion) 16. The decoder 31 decodes the encoded compressed data. The inverse quantizer 32 multiplies the output of the decoder 31 by the output of the multiplier 35, and rounds the result to an integer. The inverse DCT portion 33 subjects the data fed from the inverse quantizer 32 to inverse DCT. The inverse quantization factor output portion 34 extracts a factor for inverse quantization out of compressed data, and outputs the same. The multiplier 35 multiplies a factor fed from the inverse quantization factor output portion 34 and a correction value α fed from the correction value computation portion 16. The correction value computation portion 16, which is identical to that of Embodiment 1 described with reference to FIG. 1, computes a correction value α for correcting the quantization factor according to block position information.

As shown in FIG. 4, the compressed data inputted are decoded by the decoder 31, while being fed to the inverse quantization factor output portion 34, so that an inverse quantization factor to be used for inverse quantization is extracted. The inverse quantization factor thus extracted is fed to the multiplier 35, and the multiplier 35 multiplies the correction value α computed by the correction value computation portion 16 according to the block position information by the inverse quantization factor.

The decoded data outputted from the decoder 31 are fed to the inverse quantizer 32, and the inverse quantizer 32 inversely quantizes the decoded data by using the result of multiplication of the correction value α fed from the multiplier 35 by the inverse quantization factor. The output is fed to the inverse DCT portion 33, and is subjected to inverse DCT by the inverse DCT portion 33, thereby becoming image data. It should be noted that since the correction value computation portion 16 is identical to that included in the image compression unit 2 according to Embodiment 1, the correction value α used by the multiplier 35 is identical to the correction value α in Embodiment 1 described above. Besides, the multiplier 35 is anything as long as it consequently performs multiplication, and hence, it may be a means that performs division by using a reciprocal.

Thus, the correction value α is determined uniquely according to the block position. Therefore, even if a compression parameter of each block such as the correction value α or the quantization factor after the multiplication by the correction value α is not added to the compressed data, the compressed image data having a compression ratio varied block by block can be decompressed correctly.

Embodiment 3

Figure 5:
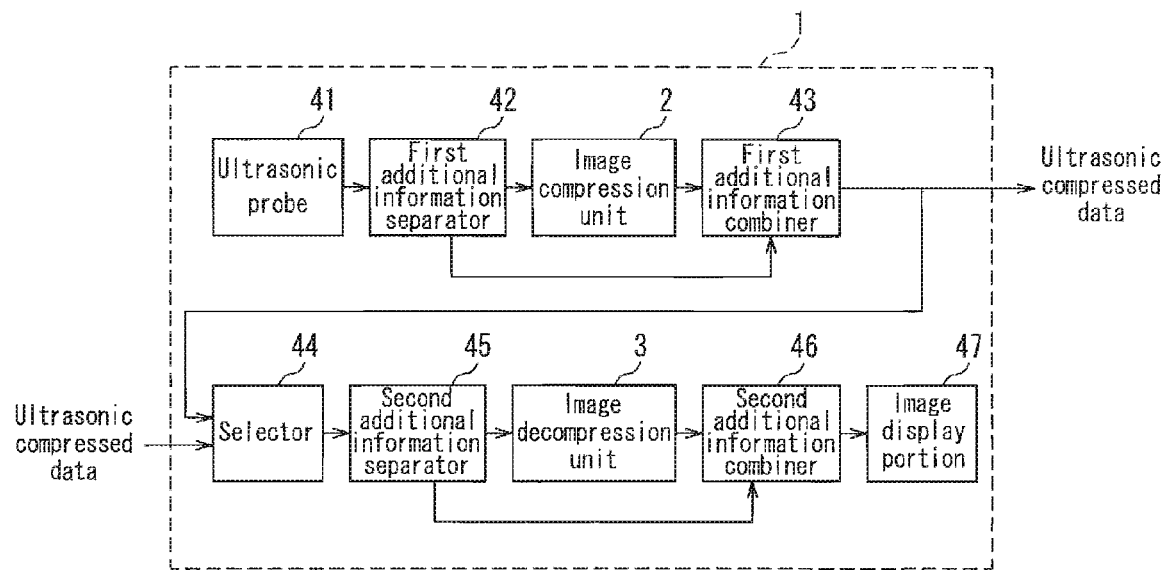
FIG. 5 is a block diagram illustrating a schematic configuration of an ultrasonic diagnostic device according to Embodiment 3 of the present invention.

FIG. 5 is a block diagram illustrating a schematic configuration of an ultrasonic diagnostic device according to Embodiment 3 of the present invention. In FIG. 5, an ultrasonic diagnostic device 1 includes an ultrasonic probe 41, a first additional information separator 42, an image compression unit 2, a first additional information combiner 43, a selector 44, a second additional information separator 45, an image decompression unit 3, a second additional information combiner 46, and an image display portion 47.

The ultrasonic probe 41 generates ultrasonic waves using the piezoelectric effect, transmits the ultrasonic waves toward the inside of a measurement object, while receiving reflected waves from the inside of the measurement object and converting the same into electric signals. The first additional information separator 42 produces ultrasonic image data based on the electric signals fed from the ultrasonic probe 41, and separates the ultrasonic image data into image data and the other data as additional information; the image data are fed to the image compression unit 2, while the additional information is fed to the first additional information combiner 43. Here, the additional information refers to information other than the pure image data among the ultrasonic image data, and includes, for example, the information about the probe used in the measurement, and parameters upon the measurement such as the focus position. The image compression unit 2, which is identical to that of Embodiment 1 described above, is capable of varying the compression ratio block by block using the correction value α determined uniquely according to the block position. The first additional information combiner 43 combines the above-described additional information with the compressed image data, which are compressed by the image compression unit 2, and outputs the same as ultrasonic compressed data.

The ultrasonic compressed data are fed to the outside of the ultrasonic diagnostic device 1 (e.g. an external memory device), or are transmitted to a main body (display section) of the ultrasonic diagnostic device 1 via a cable and fed to the selector 44. The selector 44 selects (switches) ultrasonic compressed data fed from the outside (e.g. the external memory device) or ultrasonic compressed data fed from the first additional information combiner 43, and feeds the selected data to the second additional information separator 45. The second additional information separator 45 separates the ultrasonic compressed data fed thereto into compressed image data and the other data as additional information; the compressed image data are fed to the image decompression unit 3; and the additional information is fed to the second additional information combiner 46.

The image decompression unit 3, which is identical to that of Embodiment 2 described above, is capable of restoring image data into the non-compressed state correctly, by performing decompression of compressed image data having a compression ratio varied block by block by using the same value as the correction value α according to the block position, which is used by the image compression unit 2. The second additional information combiner 46 combines the additional information to the image data decompressed by the image decompression unit 3, and feeds the obtained display data to the image display portion 47. The image display portion 47 displays, on a screen, an ultrasonic image according to the display data thus fed thereto.

The ultrasonic diagnostic device 1 of the present embodiment once compresses the ultrasonic image data obtained by the ultrasonic probe 41 and has the compressed data stored in an external memory device or transmits the compressed data via a cable, as described above. The compressed data inputted are decompressed on the main body side so as to be displayed on a display screen. Therefore, it is possible to decrease stored data or transmitted data, i.e., to improve the storing efficiency or the transmission efficiency. Moreover, since it is unnecessary to add compression parameters of each block to ultrasonic compressed data, the compression ratio can be varied block by block without an increase in the data amount.

It should be noted that in the present embodiment, the selector 44 is provided so that either ultrasonic compressed data fed from the outside or ultrasonic compressed data fed from the first additional information combiner 43 can be selected, but the selector 44 is not essential. The configuration may be such that the ultrasonic compressed data fed from the first additional information combiner 43 are fed to the second additional information separator 45 directly, or alternatively, the configuration may be such that the ultrasonic compressed data fed from the first additional information combiner 43 are fed to the outside once, and the ultrasonic compressed data from the outside are fed to the second additional information separator 45.

Embodiment 4

Figure 6:
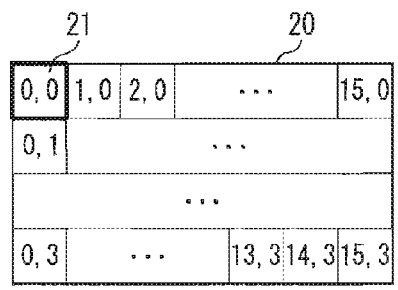
FIG. 6 shows block position information for the computation of a correction value in an ultrasonic diagnostic device according to Embodiment 4 of the present invention.

FIG. 6 illustrates a frame used for computation of a correction value by an ultrasonic diagnostic device according to Embodiment 4 of the present invention. In the frame 20, position information indicative of a position of a block 21 is added. The basic configuration of the ultrasonic diagnostic device of the present embodiment is identical to that of Embodiment 3, except for the method for computation of the correction value α by the correction value computation portion 16. More specifically, the correction value computation portion 16 shown in FIG. 1 manages the block position information used in the computation of the correction value α by using one-dimensional numerical values (serial numbers) as shown in FIG. 2, whereas the correction value computation portion 16 in the present embodiment manages the block position information by using two-dimensional numerical values. More specifically, as shown in FIG. 6, each block 21 of the frame 20 has block position information indicated by independent two-directional parameters, such as (x, y) coordinates. This allows the correction value computation portion 16 to compute the correction value α by using, for example, a function having two parameters in x and y directions, to vary the correction value α according to a parameter in either one of the directions, or the like.

Embodiment 5

Figure 7:
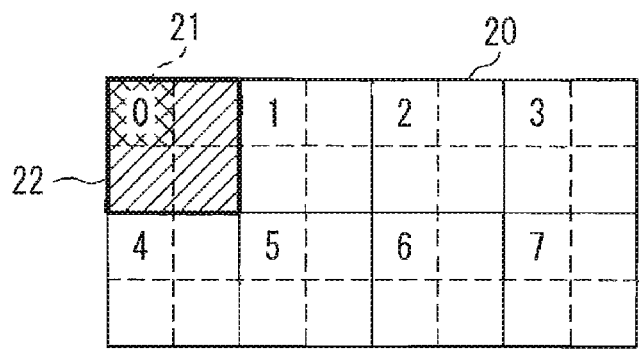
FIG. 7 shows block position information for the computation of a correction value in an ultrasonic diagnostic device according to Embodiment 5 of the present invention.

FIG. 7 shows block position information for the computation of a correction value in an ultrasonic diagnostic device according to Embodiment 5 of the present invention. The basic configuration of the ultrasonic diagnostic device of the present embodiment is identical to that of Embodiment 3, and is characterized in the method for computation of the correction value α by the correction value computation portion 16 shown in FIG. 1. More specifically, the correction value computation portion 16 in the present embodiment does not vary (increase or decrease) the correction value α block by block, the blocks being obtained by dividing a frame, but varies the correction value α region by region, and each region groups a plurality of blocks. In other words, with regard to one region, the correction value computation portion 16 computes a value commonly applicable to the entirety of the region. For example, as shown in FIG. 7, in a frame 20, with regard to rectangular regions 22, each of which is composed of four blocks 21, the correction value α is varied region by region (computed for each region). With this configuration, a quantization factor may be corrected by computing the correction value α as to each region as a unit, which is greater than a block. Therefore, the correction value (compression ratio) can be varied appropriately according to the image quality characteristic of image data, while the processing load can be reduced.

Embodiment 6

Figure 8:
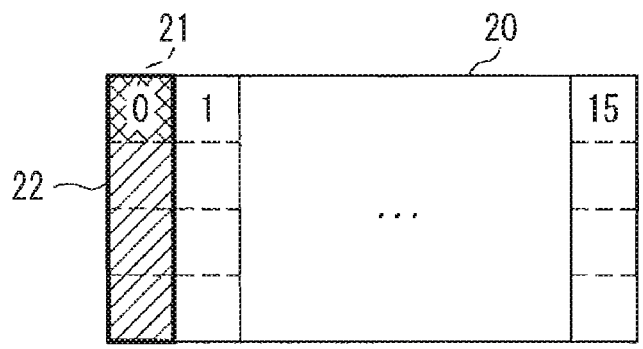
FIG. 8 shows block position information for the use in the computation of a correction value in an ultrasonic diagnostic device according to Embodiment 6 of the present invention.

FIG. 8 shows block position information for the use in the computation of a correction value in an ultrasonic diagnostic device according to Embodiment 6 of the present invention. The basic configuration of an ultrasonic diagnostic device of the present embodiment is identical to Embodiment 3, and is characterized in the method for computation of the correction value α by the correction value computation portion 16 shown in FIG. 1. Besides, the present embodiment is equivalent to a modification of Embodiment 5. More specifically, when a plurality of blocks are grouped and dealt with as one region, a plurality of blocks having the same depth in a measurement object in ultrasonic image data are grouped into one region. In the example shown FIG. 8, a frame 20 is divided into blocks 21 that are four in the vertical direction (column direction) and sixteen in the horizontal direction (row direction), i.e., sixty-four in total. Then, four blocks 21 in the vertical direction are grouped into a region 22.

Figure 9:
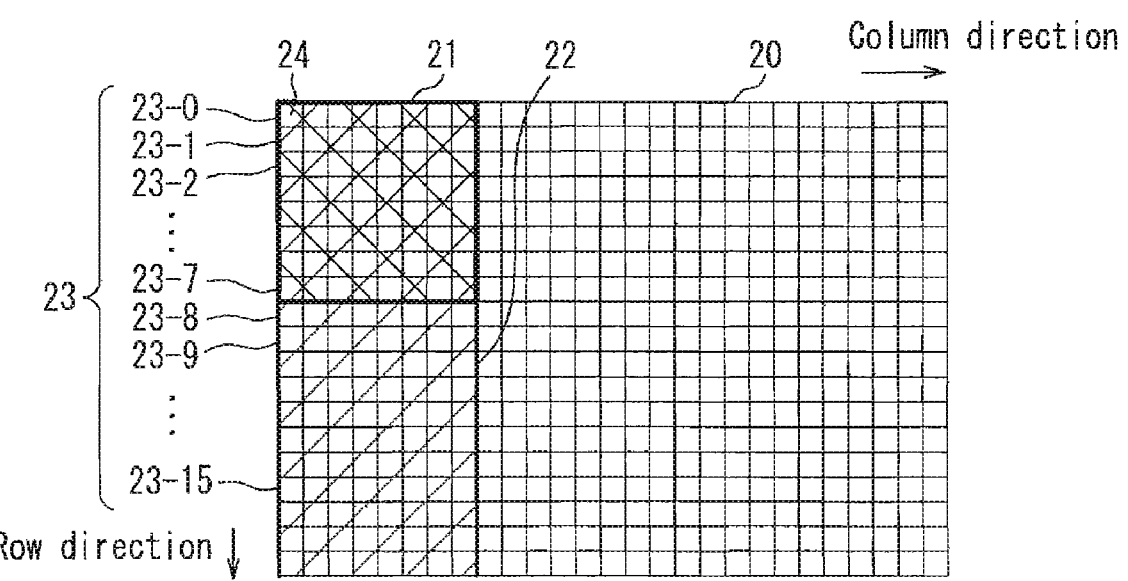
FIG. 9 is an enlarged view of an upper left portion of the frame shown in FIG. 8.
Figure 18:
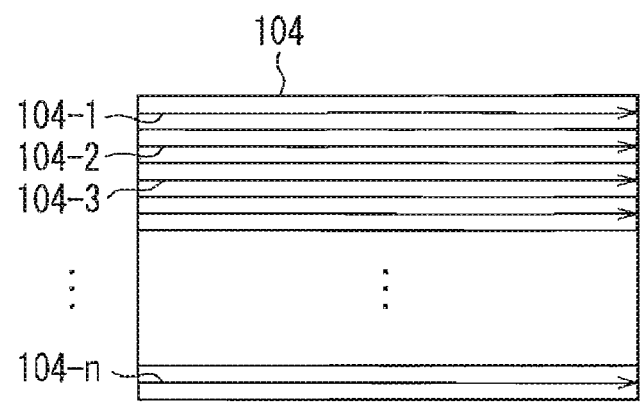
FIG. 18 schematically illustrates a structure of a reflected wave signal data of one frame.
Figure 19:
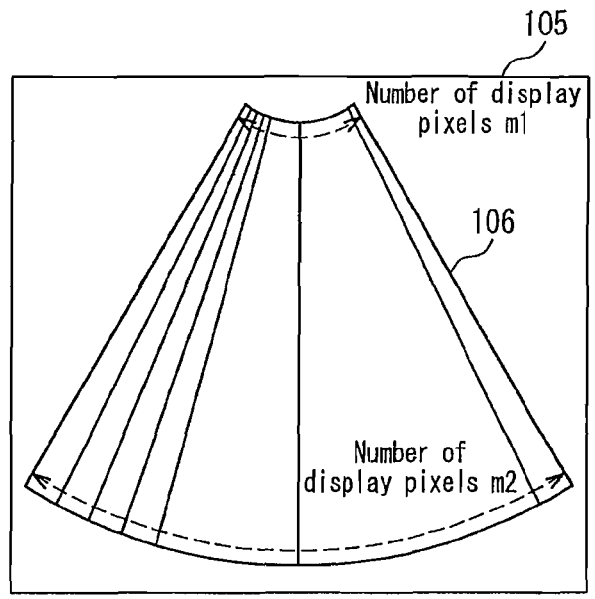
FIG. 19 schematically illustrates an ultrasonic image displayed according to a sectoral scanning range.
Figure 20:
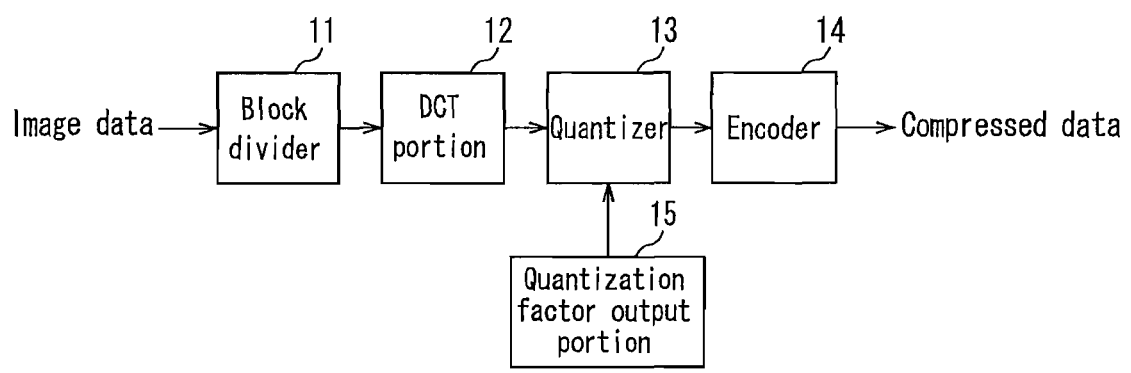
FIG. 20 is a block diagram illustrating a configuration of a conventional image compression unit.

FIG. 9 is an enlarged view of an upper left portion of the frame shown in FIG. 8. Each block 21 is composed of pixels 24, which are 8×8=64 in number. The pixel line in each column is equivalent to the acoustic line data (104-1 to 104-n) described above. More specifically, a pixel line of the first column corresponds to acoustic line data 23-0, and a pixel line in the second column corresponds to acoustic line data 23-1. This applies to the rest. Further, in the column direction, eight columns ranging from the acoustic line data 23-0 to the acoustic line data 23-7 belong to one block 21, while eight columns ranging from the acoustic lines data 23-8 to the acoustic line data 23-15 belong to next one block 22. This applies to the rest. Speaking of the row direction, as described with reference to FIG. 18, an increase in the proximity to the right end of the frame 20 means an increase in the depth.

Therefore, the correction value computation portion 16 in the present embodiment varies (computes) a correction value according to a position of a block in the depth direction in a measurement object in ultrasonic image data. As a result, the compression ratio can be corrected according to the depth. It should be noted that in the example shown in FIG. 8, the position information of the block 21 in the frame 20 is managed by using one-dimensional numerical values (serial numbers), like the case shown in FIG. 2, but alternatively the block position information may be managed by using two-dimensional numerical values, as is the case with the embodiment shown in FIG. 6. In the latter case, four blocks whose values corresponding to the x coordinates are the same may be grouped as one region. This simplifies the processing operation of easily grouping the blocks with the same depth into one region and computing a correction value α for each region.

Embodiment 7

Figures 10, 11:
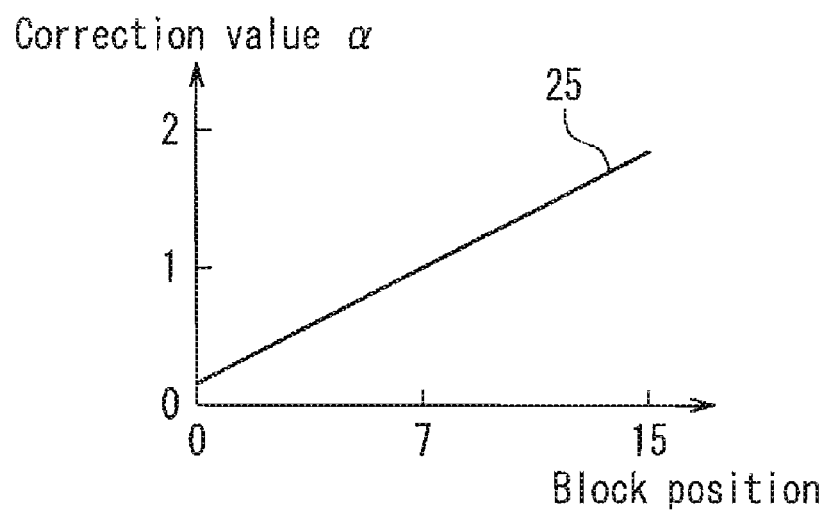
FIG. 10 is a graph showing an exemplary method for computing a correction value in an ultrasonic diagnostic device according to Embodiment 7 of the present invention.
FIG. 11 is a table showing an exemplary method for computing a correction value in an ultrasonic diagnostic device according to Embodiment 8 of the present invention.

FIG. 10 is a graph showing an exemplary method for computing a correction value in an ultrasonic diagnostic device according to Embodiment 7 of the present invention. The basic configuration of the ultrasonic diagnostic device of the present embodiment is identical to that of Embodiment 3, and is characterized in the method for computation of a correction value α by the correction value computation portion 16. Besides, the present embodiment is equivalent to a specific configuration of Embodiment 6. More specifically, the correction value computation portion 16 according to the present embodiment increases the value of the correction value α as the depth increases (the numerical value indicative of the block position increases), as shown in a graph (straight line) 25 in FIG. 10, whereby the compression ratio decreases as the depth increases.

As described above, in the case where the ultrasonic scanning range has a sectoral shape that is widened as the depth increases, the acoustic line density decreases and the image quality (resolution) degrades as the depth increases. Therefore, by computing the value of the correction value α according to the block position in the depth direction in a manner such that the compression ratio decreases as the depth increases, as is the case with the present embodiment, the image quality degradation of the ultrasonic image displayed can be suppressed. It should be noted that in the case where the block position information is managed by using two-dimensional numerical values as shown in FIG. 6, the value of the correction value α may be increased monotonically as the numerical value corresponding to the x coordinate (the depth direction) increases. However, in the case where the block position information is managed by using one-dimensional numerical values as shown in FIG. 2, it is necessary to reset the correction value α at constant intervals (e.g. each multiple of 16). In other words, in the latter case, the straight line 25 in FIG. 10 becomes a saw-tooth line in which the increase of the correction value α from its minimum value to its maximum value is repeated a plurality of times.

Embodiment 8

FIG. 11 is a table showing an exemplary method for computing a correction value in an ultrasonic diagnostic device according to Embodiment 8 of the present invention. The basic configuration of the ultrasonic diagnostic device of the present embodiment is identical to that of Embodiment 3, and is characterized in the method for computation of a correction value α by the correction value computation portion 16. More specifically, in the present embodiment, a table 26 showing the relationship between the block position and the correction value α as shown in FIG. 11 is stored preliminarily, and by referring to the table 26, the correction value computation portion 16 determines a correction value α corresponding to a block position immediately. This makes it possible to determine a correction value faster as compared with the case where a correction value is computed by an arithmetic operation, whereby the load of the processing operation is reduced. Besides, the relationship between the block position and the correction value α is not linear, and hence, this configuration is applicable to a case where it is difficult to express the relationship by a mathematical expression. It should be noted that in the table exemplarily shown in FIG. 11, the block positions are expressed by one-dimensional numerical values, but they may be expressed by two-dimensional numerical values as in the embodiment shown in FIG. 6.

Embodiment 9

Figure 12:
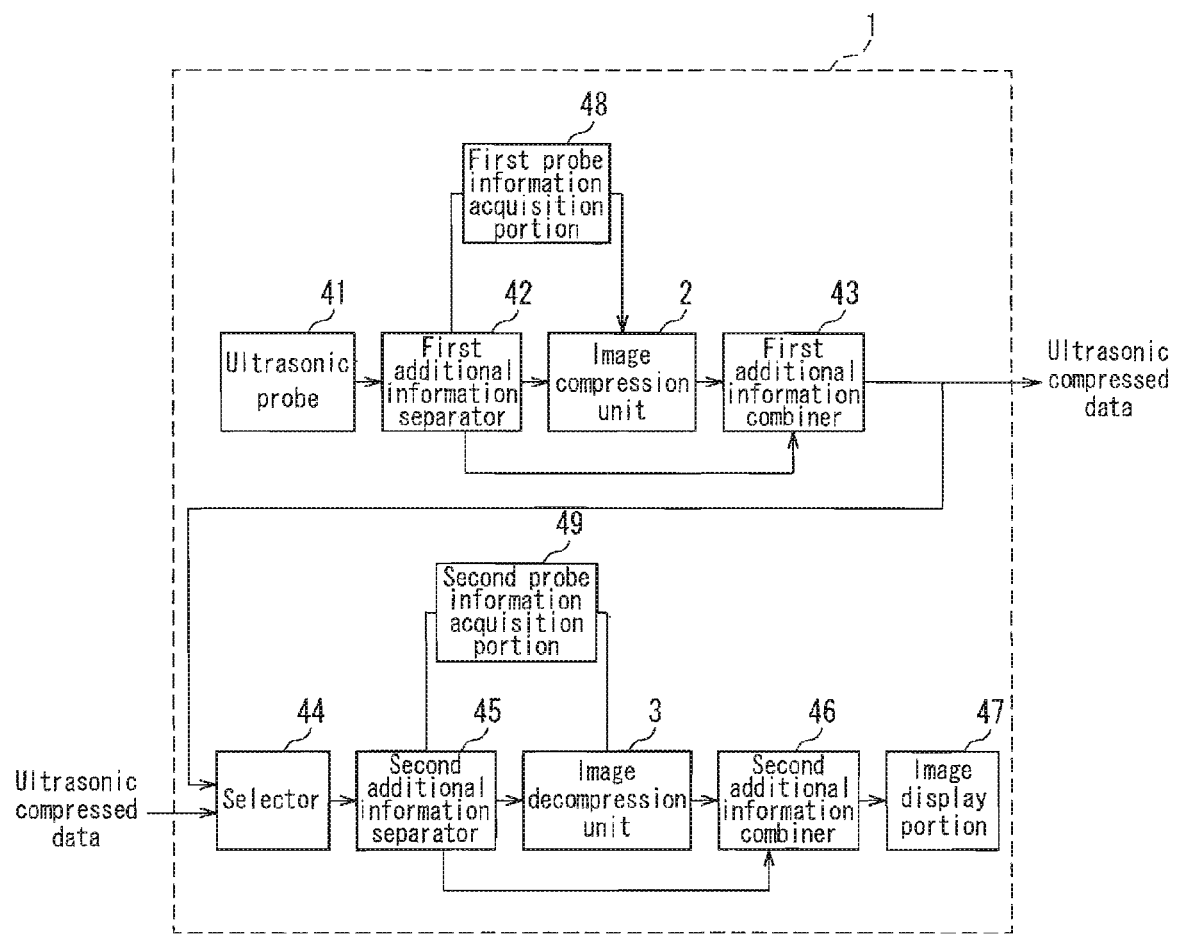
FIG. 12 is a block diagram illustrating a schematic configuration of an ultrasonic diagnostic device according to Embodiment 9 of the present invention.

FIG. 12 is a block diagram illustrating a schematic configuration of an ultrasonic diagnostic device according to Embodiment 9 of the present invention. In FIG. 12, the ultrasonic diagnostic device 1 includes an ultrasonic probe 41, a first additional information separator 42, an image compression unit 2, a first additional information combiner 43, a selector 44, a second additional information separator 45, an image decompression unit 3, a second additional information combiner 46, an image display portion 47, a first probe information acquisition portion 48, and a second probe information acquisition portion 49.

The present embodiment has a configuration obtained by adding the first probe information acquisition portion 48 and the second probe information acquisition portion 49 to the ultrasonic diagnostic device according to Embodiment 3. The first probe information acquisition portion 48 acquires probe type information among additional information fed from the first additional information separator 42, and feeds the same to the image compression unit 2. The second probe information acquisition portion 49 acquires probe type information among additional information fed from the second additional information separator, and feeds the same to the image decompression unit 3.

Figure 13:
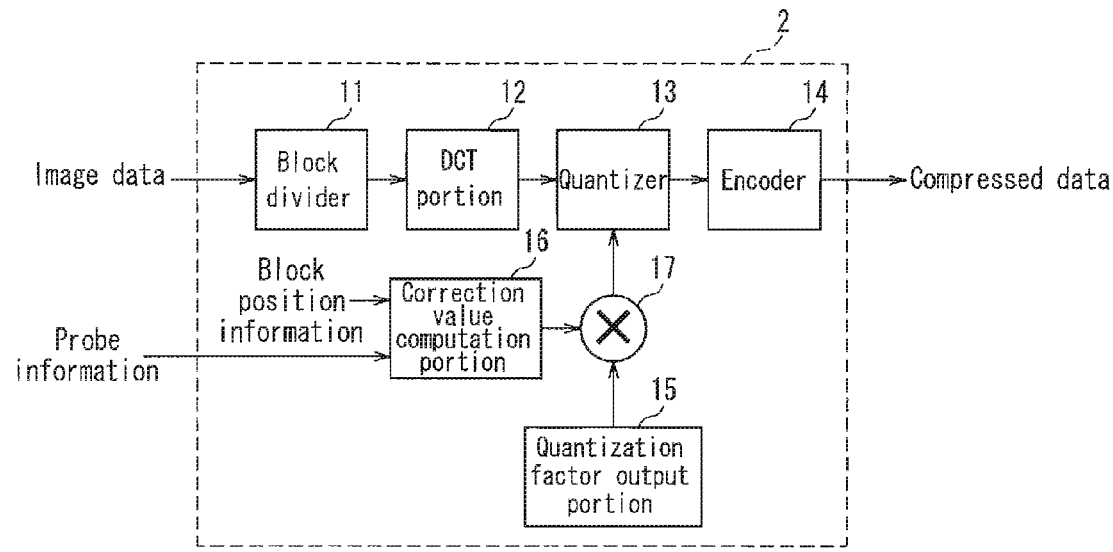
FIG. 13 is a block diagram illustrating a schematic configuration of an image compression part according to Embodiment 9 of the present invention.

FIG. 13 is a block diagram illustrating a schematic configuration of an image compression part according to Embodiment 9 of the present invention. The basic configuration of the image compression part of the present embodiment is identical to that of Embodiment 1, and is characterized in that a correction value β is computed by using the probe type information fed from the first probe information acquisition portion 48 in addition to the block position information, as inputs to the correction value computation portion 16. In other words, the correction value computation portion 16 generates a correction value β that is obtained by computing a correction value according to a block position and further correcting the correction value according to a probe type.

Figure 14:
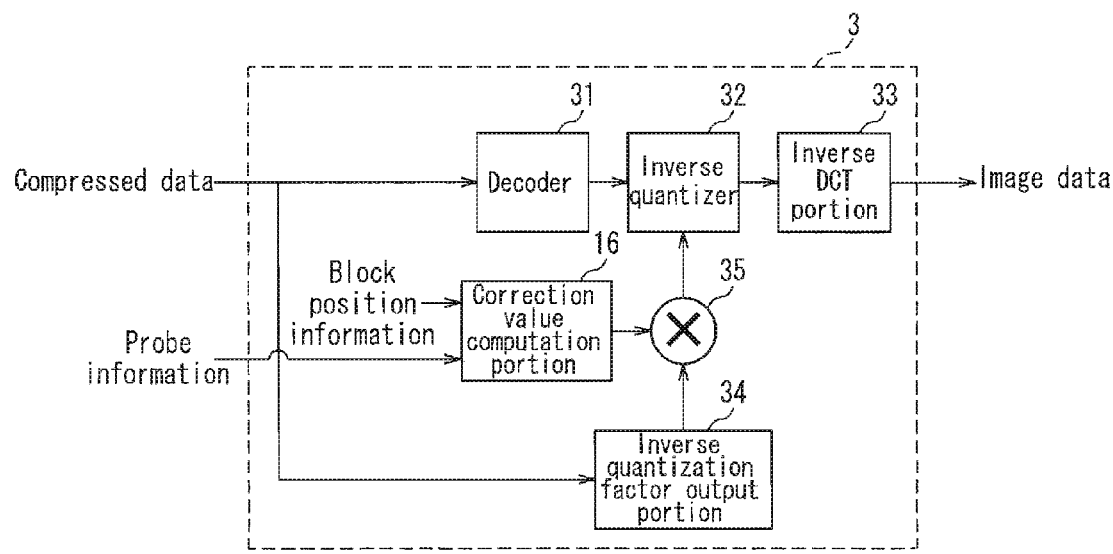
FIG. 14 is a block diagram illustrating a schematic configuration of an image decompression part according to Embodiment 9 of the present invention.

FIG. 14 is a block diagram illustrating a schematic configuration of an image decompression part according to Embodiment 9 of the present invention. The basic configuration of the image decompression part of the present embodiment is identical to that of Embodiment 2, and is characterized in that a correction value β is computed by using the probe type information fed from the second probe information acquisition portion 49 in addition to the block position information, as inputs to the correction value computation portion 16. In other words, the correction value computation portion 16 generates a correction value β that is obtained by computing a correction value according to a block position and further correcting the correction value according to a probe type, like upon the compression.

With this configuration, the manner of varying the compression ratio block by block can be set optimally according to the probe type.

It should be noted that in the present embodiment, like Embodiment 3, the selector 44 is provided so that either ultrasonic compressed data fed from the outside or ultrasonic compressed data fed from the first additional information combiner 43 can be selected, but the selector 44 is not essential. The configuration may be such that the ultrasonic compressed data fed from the first additional information combiner 43 are fed to the second additional information separator 45 and the second probe information acquisition portion 49 directly, or alternatively, the configuration may be such that the ultrasonic compressed data fed from the first additional information combiner 43 are fed to the outside once, and the ultrasonic compressed data from the outside are fed to the second additional information separator 45 and the second probe information acquisition portion 49.

Further, though the exemplary case in which the information about the probe type is used as the probe information is described as the present embodiment, the probe information is not limited to the probe type, but another information may be used.

Embodiment 10

Figure 15:
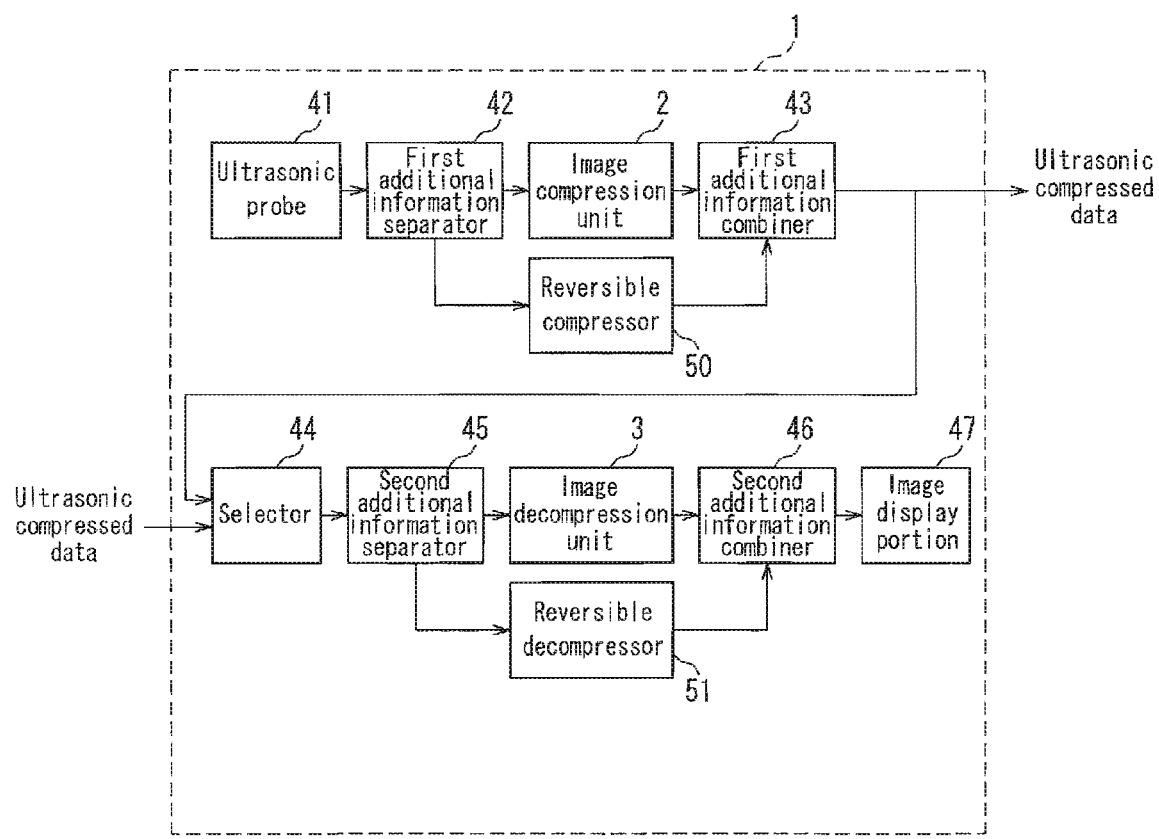
FIG. 15 is a block diagram illustrating a schematic configuration of an ultrasonic diagnostic device according to Embodiment 10 of the present invention.

FIG. 15 is a block diagram illustrating a schematic configuration of an ultrasonic diagnostic device according to Embodiment 10 of the present invention. In FIG. 15, an ultrasonic diagnostic device 1 includes an ultrasonic probe 41, a first additional information separator 42, an image compression unit 2, a first additional information combiner 43, a selector 44, a second additional information separator 45, an image decompression unit 3, a second additional information combiner 46, an image display portion 47, a reversible compressor 50, and a reversible decompressor 51.

The present embodiment has a configuration obtained by adding the reversible compressor 50 and the reversible decompressor 51 to the configuration of the ultrasonic diagnostic device according to Embodiment 3. The first additional information separator 42 separates ultrasonic image data fed from the ultrasonic probe 41 into image data and the other data as additional information; the image data are fed to the image compression unit 2, while the additional information is fed to the reversible compressor 50. The reversible compressor 50 reversibly compresses the additional information, and feeds the compressed additional information to the first additional information combiner 43. The first additional information combiner 43 combines the foregoing compressed additional information with the compressed image data compressed by the image compression unit 2, and outputs the same as ultrasonic compressed data.

Likewise, the second additional information separator 45 separates ultrasonic compressed data fed from the selector 44 into compressed image data and the other data as compressed additional information; the compressed image data are fed to the image decompression unit 3, while the compressed additional information is fed to the reversible decompressor 51. The reversible decompressor 51 decompresses the compressed additional information, and feeds the additional information to the second additional information combiner 46. The second additional information combiner 46 combines the foregoing additional information with the image data decompressed by the image decompression unit 3, and feeds the obtained display data to the image display portion 47.

With this configuration, ultrasonic image data can be compressed optimally by an irreversible compression method with a high compression ratio, while additional information can be compressed by a reversible compression method whereby the additional information can be returned to original data completely. As a result, the compression can be performed according to the properties of data, while the overall compression ratio with respect to the entirety of data can be increased.

It should be noted that the irreversible compression method is not designated particularly, and any method is applicable as long as it allows any lexicographic data to be decoded completely.

Further, in the present embodiment, the selector 44 is provided so that either ultrasonic compressed data fed from the outside or ultrasonic compressed data fed from the first additional information combiner 43 can be selected, as is the case with Embodiment 3, but the selector 44 is not essential.

Embodiment 11

Figure 16:
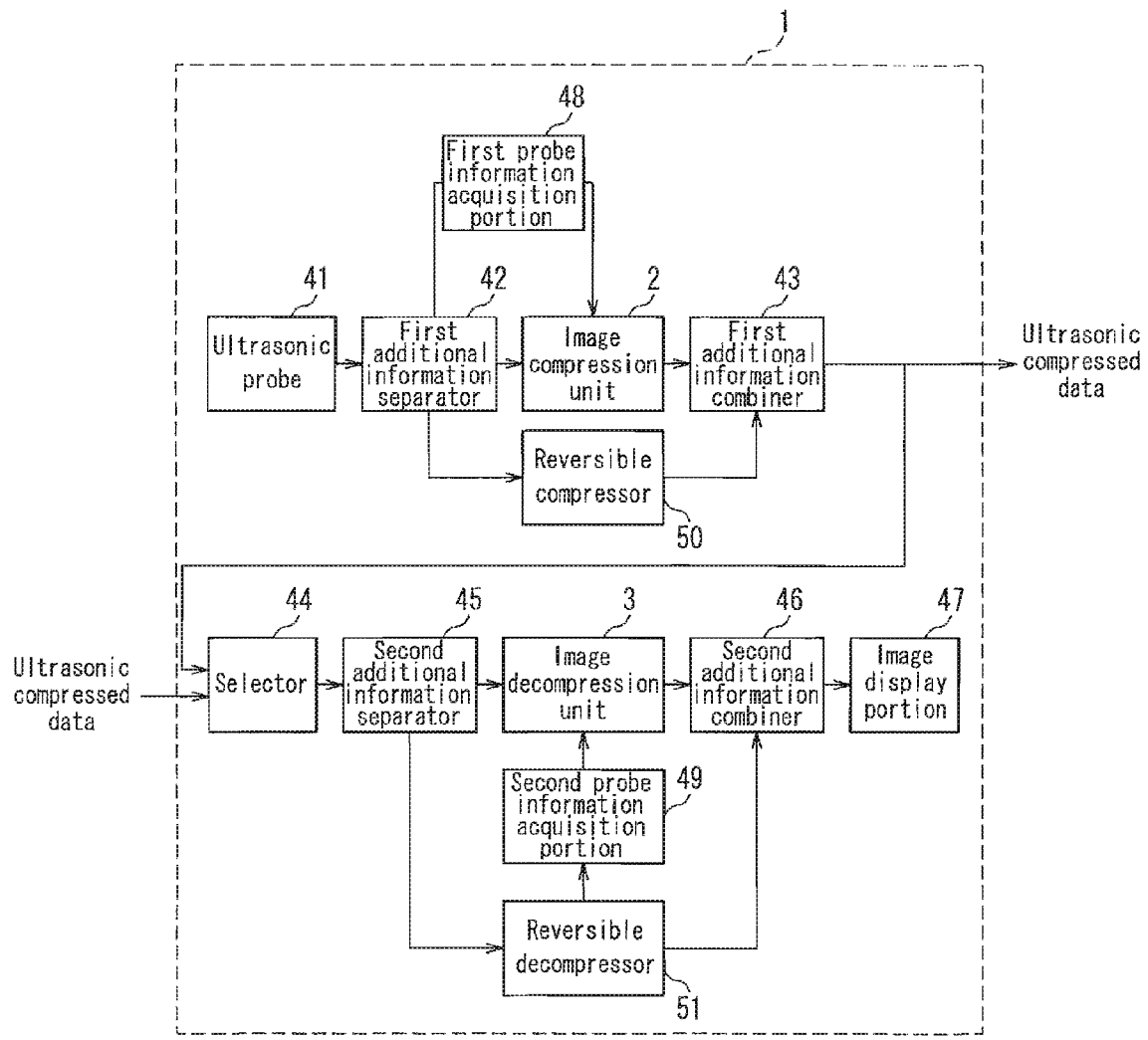
FIG. 16 is a block diagram illustrating a schematic configuration of an ultrasonic diagnostic device according to Embodiment 11 of the present invention.
Figure 17:
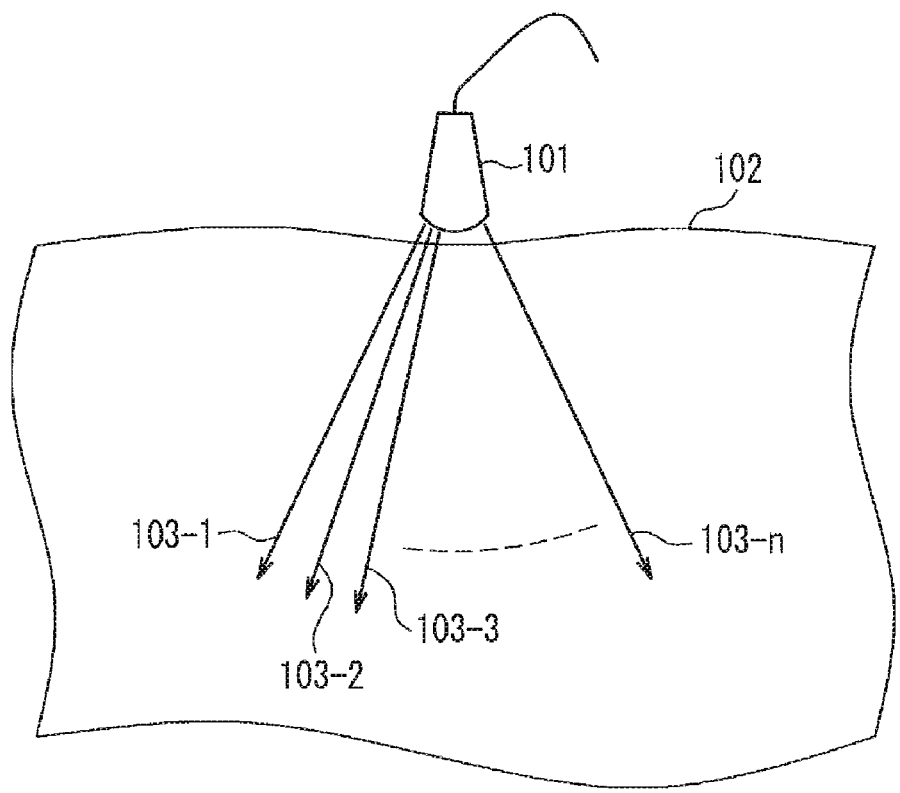
FIG. 17 illustrates an exemplary ultrasonic scanning range in a sectoral shape.

FIG. 16 is a block diagram illustrating a schematic configuration of an ultrasonic diagnostic device according to Embodiment 11 of the present invention. In FIG. 16, an ultrasonic diagnostic device 1 includes an ultrasonic probe 41, a first additional information separator 42, an image compression unit 2, a first additional information combiner 43, a selector 44, a second additional information separator 45, an image decompression unit 3, a second additional information combiner 46, an image display portion 47, a first probe information acquisition portion 48, a second probe information acquisition portion 49, a reversible compressor 50, and a reversible decompressor 51.

The present embodiment has a configuration obtained by adding the first probe information acquisition portion 48 and the second probe information acquisition portion 49 to the configuration of the ultrasonic diagnostic device according to Embodiment 10. The first probe information acquisition portion 48 acquires probe type information among additional information fed from the first additional information separator 42, and feeds the same to the image compression unit 2. The second probe information acquisition portion 49 acquires probe type information among additional information fed from the reversible decompressor 51, and feeds the same to the image decompression unit 3.

The scheme for varying, according to the probe type, the method of determining the correction value β based on the block position is identical to that of Embodiment 9, and hence, description of the same is omitted here.

This configuration allows the manner for varying the compression ratio block by block to be set optimally according to the probe type, while the compression can be performed according to the properties of data, as well as the overall compression ratio with respect to the entirety of data can be increased.

It should be noted that in the present embodiment, the selector 44 is provided so that either ultrasonic compressed data fed from the outside or ultrasonic compressed data fed from the first additional information combiner 43 can be selected, as is the case with Embodiment 3, but the selector 44 is not essential.

Further, though the exemplary case in which the information about the probe type is used as the probe type information is described as the present embodiment, the probe type information is not limited to the probe type, but another information may be used.

Several embodiments of the present invention are described above, but the present invention is not limited to these embodiments, but may be carried out in various forms.

INDUSTRIAL APPLICABILITY

The present invention can be used advantageously, particularly in the case where in an ultrasonic diagnostic device, an ultrasonic image is compressed, and recorded or transmitted, and the compressed image is decompressed and displayed. According to the present invention, in the case where the image quality (resolution) of an original image varies in one frame regularly by a certain rule, the compression ratio can be varied in the frame, without compression parameters of each block being encoded.

The invention claimed is:

1. An image compression unit comprising:
    a block divider that divides inputted image data into a plurality of blocks;
    a DCT portion that subjects the image data of each block to DCT;
    a quantization factor output portion that outputs a quantization factor as a numerical value indicative of fineness of quantization;
    a correction value computation portion that computes a correction value that is determined uniquely according to information of a block position in a frame of the image data divided by the block divider;
    a quantizer that quantizes the data having been subjected to DCT, based on a value obtained by multiplying the correction value outputted by the correction value computation portion by the quantization factor outputted by the quantization factor output portion; and
    an encoder that encodes the quantized data and outputs compressed data.

2. The image compression unit according to claim 1, wherein the correction value computed by the correction value computation portion varies continuously or stepwise and is determined uniquely according to the information of the block position.

3. An image decompression unit comprising:
    a decoder that decodes encoded compressed data;
    an inverse quantization factor output portion that derives an inverse quantization factor from the compressed data and outputs the inverse quantization factor;
    a correction value computation portion that computes a correction value that is determined uniquely according to information of a block position in a frame of the image data divided by the block divider;
    an inverse quantizer that, as to each block, inversely quantizes the output data of the decoder corresponding to the block, based on a value obtained by multiplying the correction value outputted by the correction value computation portion by the quantization factor outputted by the inverse quantization factor output portion; and
    an inverse DCT portion that subjects the inversely quantized data to inverse DCT and outputs image data restored into a non-compressed state.

4. The image compression unit according to claim 3, wherein the correction value computed by the correction value computation portion varies continuously or stepwise and is determined uniquely according to the information of the block position.

5. An ultrasonic diagnostic device comprising:
an ultrasonic probe that transmits ultrasonic waves to a measurement object, receives reflected waves from the measurement object, and convert the reflected waves into electric signals;
an image compression unit that compresses ultrasonic image data obtained by processing the electric signal of the reflected waves obtained from the ultrasonic probe; and
an image decompression unit that decompresses compressed ultrasonic image data so as to obtain ultrasonic image data restored into a non-compressed state,
wherein the image compression unit includes:
a block divider that divides inputted image data into a plurality of blocks;
a DCT portion that subjects the image data of each block to DCT;
a quantization factor output portion that outputs a quantization factor as a numerical value indicative of fineness of quantization;
a first correction value computation portion that computes a correction value that is determined uniquely according to information of a block position in a frame of the image data divided by the block divider;
a quantizer that quantizes the data having been subjected to DCT, based on a value obtained by multiplying the correction value outputted by the first correction value computation portion by the quantization factor outputted by the quantization factor output portion; and
an encoder that encodes the quantized data and outputs compressed data, and
the image decompression unit includes:
a decoder that decodes encoded compressed data;
an inverse quantization factor output portion that derives an inverse quantization factor from the compressed data and outputs the inverse quantization factor;
a second correction value computation portion that computes a correction value that is determined uniquely according to information of a block position in a frame of the image data divided by the block divider;
an inverse quantizer that, as to each block, inversely quantizes the output data of the decoder corresponding to the block, based on a value obtained by multiplying the correction value outputted by the second correction value computation portion by the quantization factor outputted by the inverse quantization factor output portion; and
an inverse DCT portion that subjects the inversely quantized data to inverse DCT and outputs image data restored into a non-compressed state.

6. The ultrasonic diagnostic device according to claim 5, wherein each of the first correction value computation portion and the second correction value computation portion presents the block positions with two-dimensional numerical values, and computes the correction value based on the two-dimensional numerical values.

7. The ultrasonic diagnostic device according to claim 5, wherein each of the first correction value computation portion and the second correction value computation portion computes, as the correction value, a value commonly applicable to a region that groups a plurality of the blocks.

8. The ultrasonic diagnostic device according to claim 5, wherein each of the first correction value computation portion and the second correction value computation portion computes the correction value according to the block position in a depth direction in the measurement object in the ultrasonic image data.

9. The ultrasonic diagnostic device according to claim 8, wherein each of the first correction value computation portion and the second correction value computation portion computes the correction value so that as the depth in the measurement object in the ultrasonic image data increases, a compression ratio for a block concerned decreases.

10. The ultrasonic diagnostic device according to claim 5, wherein each of the first correction value computation portion and the second correction value computation portion computes the correction value according to the information of the block position, by referring to a preliminarily stored table that shows the relationship between the information of the block positions and the correction values.

11. The ultrasonic diagnostic device according to claim 5, further comprising:
a first additional information separator that separates the ultrasonic image data obtained from the ultrasonic probe into image data and additional information;
a first probe information acquisition portion that acquires probe information from the additional information outputted by the first additional information separator;
a first additional information combiner that combines the additional information with the image data compressed by the image compression unit;
a second additional information separator that separates the ultrasonic compressed data combined by the first additional information combiner into image data and additional information;
a second probe information acquisition portion that acquires probe information from the additional information outputted by the second additional information separator; and
a second additional information combiner that combines the additional information with image data decompressed by the image data decompressed by the image decompression unit,
wherein the first correction value computation portion computes a correction value that is determined uniquely according to the probe information as well as information of a block position of the image data, and
the second correction value computation portion computes a value that is identical to the value computed by the first correction value computation portion.

12. The ultrasonic diagnostic device according to claim 5, further comprising:
a first additional information separator that separates the ultrasonic image data obtained from the ultrasonic probe into image data and additional information;
a reversible compressor that reversibly compresses the additional information separated by the first additional information separator;
a first additional information combiner that combines the reversibly compressed additional information with the image data compressed by the image compression unit;
a second additional information separator that separates the compressed data combined by the first additional information combiner into image data and additional information;
a reversible decompressor that reversibly decompresses the additional information separated by the second additional information separator; and a second additional information combiner that combines the reversibly decompressed additional information with the image data decompressed by the image decompression unit.

13. The ultrasonic diagnostic device according to claim 5, further comprising:
a first additional information separator that separates the ultrasonic image data obtained from the ultrasonic probe into image data and additional information;
a first probe information acquisition portion that acquires probe information from the additional information outputted by the first additional information separator;
a reversible compressor that reversibly compresses the additional information;
a first additional information combiner that combines the reversibly compressed additional information with the image data compressed by the image compression unit;
a second additional information separator that separates the ultrasonic compressed data combined by the first additional information combiner into image data and additional information;
a reversible decompressor that reversibly decompresses the additional information separated by the second additional information separator;
a second probe information acquisition portion that acquires probe information from the additional information outputted by the reversible decompressor;
a second additional information combiner that combines the additional information with the image data decompressed by the image decompression unit,
wherein the first additional value computation portion computes a correction value that is determined uniquely according to the probe information as well as information of a block position of the image data, and
the second correction value computation portion computes a value that is identical to the value computed by the first correction value computation portion, the value being determined uniquely according to the probe information as well as information of a block position of the image data.

* * * * *